United States Patent

Busse et al.

[11] 4,052,314
[45] Oct. 4, 1977

[54] FILTER PLATE FOR A PLATE TYPE FILTER PRESS

[75] Inventors: Oswald Busse; Hugo Klesper, both of Aarbergen, Germany

[73] Assignee: Passavant-Werke Michelbacher Hutte, Germany

[21] Appl. No.: 700,322

[22] Filed: June 28, 1976

[30] Foreign Application Priority Data

June 28, 1975 Germany .............................. 7520639

[51] Int. Cl.² ............................................. B01D 25/12
[52] U.S. Cl. ................................... 210/230; 210/231
[58] Field of Search ............................... 210/224–231, 210/236; 100/295–297

[56] References Cited

U.S. PATENT DOCUMENTS

| 3,503,326 | 3/1970 | Juhasz et al. ..................... 210/225 X |
| 3,807,298 | 4/1974 | Luke et al. ........................ 210/230 X |
| 3,888,769 | 6/1975 | Schotten et al. ..................... 210/227 |

FOREIGN PATENT DOCUMENTS

1,486,816   7/1969   Germany .............................. 210/227

*Primary Examiner*—Wilbur L. Bascomb, Jr.
*Assistant Examiner*—Robert H. Spitzer
*Attorney, Agent, or Firm*—Woodford R. Thompson, Jr.

[57] ABSTRACT

A filter plate having a plate frame with filtrate discharge means covered by filter cloth adjacent the bottom of a filter cake chamber defined by recesses in the plate. A cam projects from the bottom of the filter cake chamber and is adapted to support the filter plate on a corresponding cam on an adjacent filter plate with the cam extending substantially to the level of the outer surface of the frame of the filter plate. An opening is provided in the filter cloth covering the plate frame for receiving the cam. A clamping ring surrounds the cam and the filter cloth adjacent thereto to form a seal therebetween. A washer-like member overlies the cam and a portion of the clamping ring and retains the clamping ring in place.

5 Claims, 1 Drawing Figure

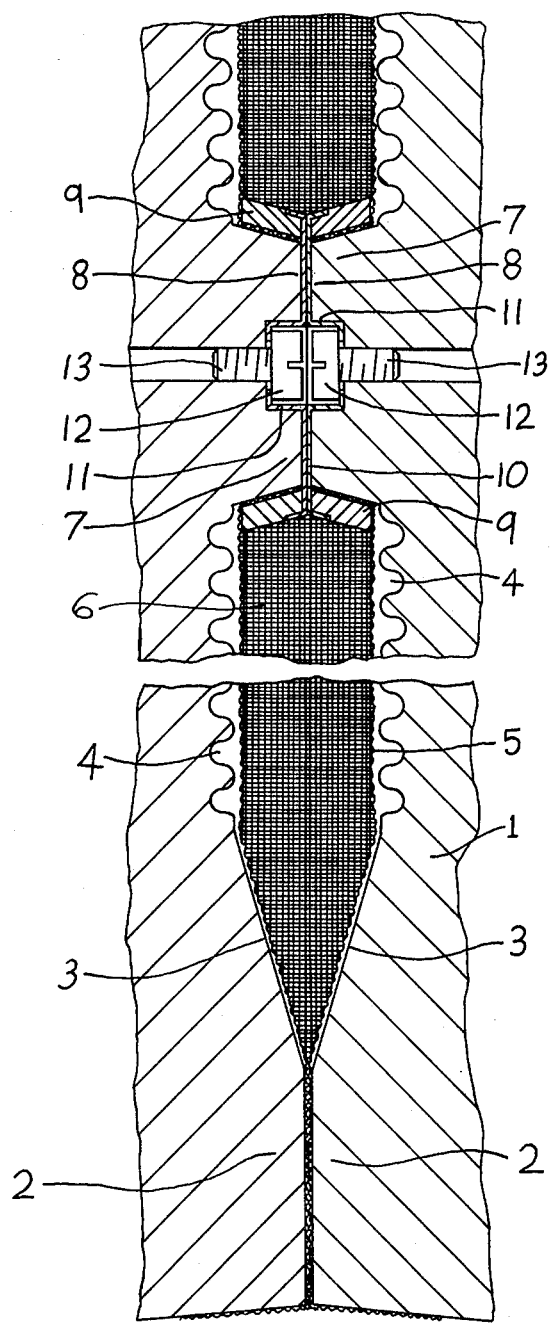

FILTER PLATE FOR A PLATE TYPE FILTER PRESS

BACKGROUND OF THE INVENTION

This invention relates to a filter plate for a plate type filter press, which is particularly adapted for use in the dewatering of sewage sludges.

As is well known, any number of such filter plates can be slidably attached side by side to the usual horizontal guide means of the filter press frame. The filter plates are provided with suitable filtrate discharge ports or the like and are covered on both sides by filter cloth which is disposed at the bottom of the cake chambers formed by recesses in the filter plates. When the filter press is ready for operation, the filter plates are moved from their spaced apart locations and pushed closely together and hydraulically pressed against each other. The suspension to be dewatered is then introduced into the filter chambers. The solids remain on the filter media forming filter cakes thereon, whereas the filtrate passes through the cloth and then through the usual discharge ports in the plates whereupon it will be disposed of as desired.

In view of the large size of conventional filter plates used at the present, it is necessary to support the filter plates on each other by at least one staying means in addition to the filter plate supporting frame, with such staying means being provided inside the cake chamber. This is very desirable in view of possible pressure difference building up on either side of a filter plate during introduction of the suspension which results in high bending stresses.

In conventional apparatus cams have been employed to overcome this disadvantage with such cams extending from the chamber essentially out of the level of the plate frame. However, problems are encountered with such cams due to the fact that the filter cloth covers the entire surface of the plate and is secured at its edges.

One attempt to solve this problem was to place the filter cloth over the cam. However, it was found that the cloth was under too much tension at the junction of the cam and filter chamber so as to become unusable after a short period of use.

Later, by way of improvement, such cams were not formed integrally with the filter plate but were fastened thereto by screw means with the filter cloth being inserted and fastened between the plate and the cam. But even this attempt to solve the problem had a serious drawback due to the construction of the plate. The surface against which the cam abuts could not be manufactured and finished with the frame in a single operation. Also, as the filter cloth is later interposed between two metal surfaces its final thickness under compression, cannot be predetermined accurately. Accordingly, considerable differences in height resulted between the outer surface of the cam and the outer surface of the filter cloth near the plate frame with such differences interfering with the support of the plates upon one another.

In addition to these attempts to solve the above mentioned problem the filter cloth has been provided with a cutout for the cam, with the edge of this cutout being sealingly retained by means of a clamping ring. Such a conventional design is shown in the German design patent No. 1,967,244 wherein an O-ring used for this purpose is fitted in a groove at the bottom of the cam. But even this attempt was not satisfactory from a constructional point of view. First, it was difficult to cut the groove for the O-ring and second, it was still not possible to finish the surface of the cam and the plate frame in a single operation. Since the filter cloth is disposed on the filter frame and not on the cam, the resulting difference in height makes it difficult to support the plates properly.

SUMMARY OF THE INVENTION

An object of the present invention is to eliminate the above mentioned difficulties by providing means for fastening and sealing the filter cloth adjacent the cams which permits a finishing of the cam surface and the plate frame in one and the same operation. According to our invention this is achieved by retaining a clamping ring in place by means of a washer or the like which extends over the supporting cam. Such a washer is easily attached to the cam by simply clamping it in place, since it will be held in place by the pressure of the made-up press, and in addition by the working pressure during filtration. Accordingly, the sealing and clamping effect of the ring will be strengthened during operation. The pressure differential between the plates will no longer be transmitted through the filter cloth to the plate, whereby the service life of the cloth will be considerably prolonged.

DESCRIPTION OF THE DRAWING

A filter plate embodying features of our invention is illustrated in the accompanying drawing, forming a part of this application, in which the single view is a fragmental, vertical sectional view, partly broken away and showing portions of adjacent filter plates.

DETAILED DESCRIPTION

One embodiment of our invention will now be described more specifically with reference being had to the attached drawing. We show abutting filter plates 1 having the usual frames 2 which extend over the entire plate thickness. Each filter plate 1 has recesses 3 in opposite sides thereof with the bottom of each recess 3 being provided with filtrate discharge grooves 4. Filter cloth 5 extends over each of the frames 2 and the grooves 4 and defines a chamber 6 between adjacent frames wherein the filter cake is retained during operation.

A cam 7 is located at one or several places on each filter plate 1 and extends outwardly from the bottom of each recess 3 inside the chamber 6, as shown, with the outer surface 8 of the cam 7 being at the same level as the outer surface of the frame 2. The filter cloth 5 is cut out at the location of each cam 7, as shown.

A clamping ring 9 telescopes over each of the cams 7 and the adjacent portion of the filter cloth 5 to provide a seal between the filter chamber 6 and the grooves 4. The ring 9 is retained in place by means of a washer 10 having an indentation 11 adjacent its center to receive the head 12 of a retaining screw 13. The thickness of the washer 10 is so selected that, when the press is ready for operation with the filter cloth 5 clamped in place, the outer surface of the washer 10 is either on the same level with the outer surface of the plate frame 2 including the filter cloth 5 or is slightly inwardly of the outer surface of the frame 2. In some cases it may be necessary to provide the filter plates with a certain bending margin or tolerance whereby adjacent plates are permitted to bear on each other only when the pressure differential on opposite sides of the plate has reached a predetermined level and the plate has been bent a predetermined amount. To accomplish this, we so dimension the washer 10 that its outer surface extends in a plane inwardly of the outer surface of the frame 2 ranging from 0.1 to 0.5 mm. That is, the outer surface of the washer 10 is undersize in relation to the cloth covered plate frame 2. The screw 13 may of course be replaced by other suitable fastening means, such as a tightening or retaining pin. Also, the washer 10 may be circular, as shown, or may be of other suitable forms. It is not necessary that the clamping ring 9 and washer 10 be permanently connected to each other, since these parts may be separate from each other so as to be assembled and disassembled one after the other.

The surfaces of the cam 7 and the plate frame 2 are easily finished in a single operation where the thickness of the washer 10 is approximately equal to that of the filter cloth 5. In operation, when the plate frames 2 closely abut each other as shown, the cams 7 with their overlying washers 10 will also be in contact with one another, whereby the plates will be supported entirely one upon the other. Such dimensioning has another advantage in that varying thickness of filter cloth 5 can be easily compensated for by corresponding washers 10 of equal thickness, whereas the filter plate itself remains the same for any desired cloth thickness.

For a quick change of the filter cloth 5 it is advantageous to secure the washer 10 to the cam 7 so that it can be detached easily. The clamping ring 9 is preferably made of rubber or of a similar elastic material.

While we have shown our invention in but one form it will be obvious to those skilled in the art that it is not so limited, but is susceptible of various changes and modifications without departing from the spirit thereof.

What we claim is:

1. In a filter plate for a plate type filter press particularly adapted for use in the dewatering of sewage sludges wherein each filter plate of said filter press is adjacent another filter plate with each filter plate having a plate frame with filtrate discharge means covered by filter cloth disposed adjacent the bottom of a filter cake chamber formed by recesses in the filter plate, the improvement comprising:
    a. at least one cam projecting from the bottom of said filter cake chamber of said filter plate in position to engage a corresponding cam on an adjacent filter plate and support its filter plate on said corresponding cam on an adjacent filter plate with said cam extending substantially to the level of the outer surface of the frame of its filter plate,
    b. said filter cloth covering its plate frame and having an opening therein adapted to receive said cam,
    c. a clamping ring surrounding said cam and the filter cloth adjacent thereto to provide a seal therebetween, and
    d. a washer-like member overlying and forming part of said cam and overlying a portion of said clamping ring and retaining said clamping ring in place.
2. A filter plate as defined in claim 1 in which the thickness of said washer-like member is substantially equal the thickness of said filter cloth.
3. A filter plate as defined in claim 1 in which the outer surface of said washer-like member is located inwardly with respect to its plate frame covered with cloth a distance ranging from 0.1 to 0.5 mm.
4. A filter plate as defined in claim 1 in which said washer-like member is detachably connected to its cam.
5. A filter plate as defined in claim 1 in which said clamping ring is a rubber-like member.

* * * * *